United States Patent
Bharadwaj et al.

(10) Patent No.: US 9,058,497 B2
(45) Date of Patent: Jun. 16, 2015

(54) CRYPTOGRAPHIC KEY MANAGEMENT

(75) Inventors: Vijay G. Bharadwaj, Redmond, WA (US); Niels T Ferguson, Redmond, WA (US); Carl M. Ellison, New York, NY (US); Magnus Bo Gustaf Nyström, Sammamish, WA (US); Dayi Zhou, Redmond, WA (US); Denis Issoupov, Bellevue, WA (US); Octavian T. Ureche, Renton, WA (US); Peter J. Novotney, Seattle, WA (US); Cristian M. Ilac, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1151 days.

(21) Appl. No.: 12/978,266

(22) Filed: Dec. 23, 2010

(65) Prior Publication Data

US 2014/0108814 A1     Apr. 17, 2014

(51) Int. Cl.
  *G06F 21/00*   (2013.01)
  *G06F 21/60*   (2013.01)
  *H04L 9/08*    (2006.01)

(52) U.S. Cl.
  CPC ...... *G06F 21/602* (2013.01); *G06F 2221/2141* (2013.01); *H04L 9/0836* (2013.01); *H04L 9/0866* (2013.01)

(58) Field of Classification Search
  CPC .................................................. G06F 21/602
  USPC ........................................................ 380/37
  See application file for complete search history.

(56) References Cited

U.S. PATENT DOCUMENTS

| | | |
|---|---|---|
| 6,148,342 A | 11/2000 | Ho |
| 6,226,618 B1 | 5/2001 | Downs et al. |
| 6,249,866 B1 | 6/2001 | Brundrett et al. |
| 6,363,488 B1 | 3/2002 | Ginter et al. |
| 6,678,828 B1 | 1/2004 | Pham et al. |
| 6,697,944 B1 | 2/2004 | Jones et al. |
| 6,931,530 B2 | 8/2005 | Pham et al. |
| 7,110,982 B2 | 9/2006 | Feldman |
| 7,155,415 B2 | 12/2006 | Russell et al. |
| 7,213,005 B2 | 5/2007 | Mourad et al. |
| 7,213,266 B1 | 5/2007 | Maher et al. |
| 7,272,723 B1 | 9/2007 | Abbott |
| 7,305,562 B1 | 12/2007 | Bianco |
| 7,406,603 B1 | 7/2008 | MacKay et al. |

(Continued)

FOREIGN PATENT DOCUMENTS

| | | |
|---|---|---|
| CN | 101164273 A | 4/2008 |
| WO | 2007001329 A2 | 1/2007 |
| WO | WO-2007127349 | 11/2007 |

OTHER PUBLICATIONS

"Non-Final Office Action", U.S. Appl. No. 12/404,007, (Jul. 20, 2011), 28 pages.

(Continued)

*Primary Examiner* — Morshed Mehedi
(74) *Attorney, Agent, or Firm* — Merchant & Gould P.C.

(57) ABSTRACT

Cryptographic key management techniques are described. In one or more implementations, an access control rule is read that includes a Boolean expression having a plurality of atoms. The cryptographic keys that corresponds each of the plurality of atoms in the access control rule are requested. One or more cryptographic operations are then performed on data using one or more of the cryptographic keys.

15 Claims, 8 Drawing Sheets

(56) References Cited

U.S. PATENT DOCUMENTS

| | | | |
|---|---|---|---|
| 7,509,492 B2* | 3/2009 | Boyen et al. ............... | 713/165 |
| 7,792,301 B2 | 9/2010 | Bharadwaj et al. | |
| 8,364,984 B2 | 1/2013 | Jeffries et al. | |
| 2002/0019935 A1 | 2/2002 | Andrew et al. | |
| 2002/0077985 A1 | 6/2002 | Kobata et al. | |
| 2002/0141574 A1 | 10/2002 | Henson et al. | |
| 2002/0147929 A1 | 10/2002 | Rose | |
| 2003/0046366 A1 | 3/2003 | Pardikar et al. | |
| 2003/0105950 A1 | 6/2003 | Hirano et al. | |
| 2003/0110397 A1* | 6/2003 | Supramaniam et al. ...... | 713/201 |
| 2003/0196114 A1 | 10/2003 | Brew et al. | |
| 2004/0039926 A1 | 2/2004 | Lambert | |
| 2004/0064710 A1* | 4/2004 | Vainstein ............... | 713/189 |
| 2004/0117489 A1 | 6/2004 | Harmon et al. | |
| 2004/0123104 A1* | 6/2004 | Boyen et al. ............... | 713/165 |
| 2004/0128498 A1 | 7/2004 | Lang | |
| 2005/0039034 A1 | 2/2005 | Doyle et al. | |
| 2006/0018484 A1 | 1/2006 | Yoshihiro et al. | |
| 2006/0050870 A1 | 3/2006 | Kimmel et al. | |
| 2006/0149679 A1* | 7/2006 | Nishizawa et al. ........... | 705/51 |
| 2006/0218650 A1 | 9/2006 | Costa-Requena et al. | |
| 2007/0266252 A1 | 11/2007 | Davis et al. | |
| 2008/0034205 A1 | 2/2008 | Alain et al. | |
| 2008/0137841 A1* | 6/2008 | Jajodia ............... | 380/28 |
| 2008/0173709 A1 | 7/2008 | Ghosh | |
| 2008/0181412 A1* | 7/2008 | Acar et al. ............... | 380/279 |
| 2008/0216169 A1 | 9/2008 | Naizhen et al. | |
| 2008/0244691 A1 | 10/2008 | Hilerio et al. | |
| 2009/0070580 A1 | 3/2009 | Cobelo et al. | |
| 2009/0158030 A1* | 6/2009 | Rasti ............... | 713/156 |
| 2010/0235649 A1 | 9/2010 | Jeffries | |
| 2010/0299762 A1 | 11/2010 | Jouret et al. | |
| 2011/0145840 A1* | 6/2011 | Kristensson et al. ......... | 719/328 |

OTHER PUBLICATIONS

"Final Office Action", U.S. Appl. No. 12/404,007, (Nov. 23, 2011), 29 pages.
Bharadwaj, et al., "Towards Automated Negotiation of Access Control Policies", Retrieved at << http://citeseerx.ist.psu.edu/viewdoc/download?doi=10.1.1.9.6765&rep=rep1&type=pdf >>, Proceedings Policy IEEE 4th International Workshop on Policies for Distributed Systems and Networks, Jun. 4-6, 2003, pp. 9.
Linn, et al., "Attribute Certification: An Enabling Technology for Delegation and Role-Based Controls in Distributed Environments", Retrieved at << https://www.infosecurity.org.cn/content/pki_pmi/dist_use_pmi.pdf >>, Fourth ACM Workshop on Role-Based Access Control, Oct. 28-29, 1999, pp. 121-130.
Oppliger, et al., "A Distributed Certificate Management System (DCMS) Supporting Group based access controls", Retrieved at << http://citeseerx.ist.psu.edu/viewdoc/download?doi=10.1.1.97.5300&rep=rep1&type=pdf >>, 15th Annual Computer Security Applications Conference (ACSAC), Dec. 6-10, 1999, pp. 8.
Hicks, John., "Cryptography in SQL Server", Retrieved at << http://msdn.microsoft.com/en-us/library/cc837966%28SQL.100%29.aspx >>, Jul. 2008, pp. 18.
Bharadwaj, et al., "Access Control and Encryption in Multi-User Systems", U.S. Appl. No. 11/427,660, filed Jan. 24, 2008, pp. 42.
"Portable Secure Data Files", U.S. Appl. No. 12/404,007, filed Sep. 16, 2010, pp. 1-44.
"20 Database Security", Retrieved from: <http://www.stanford.edu/dept/itss/docs/oracle/10g/server.101/b10743/security.htm> on Dec. 15, 2008, Oracle® Database Concepts, 10g Release 1 (10.1),(Dec. 2003),28 pages.
"Encrypting File System in Windows XP and Windows .NET Server", *Microsoft Corporation*, Aug. 2002, pp. 1-59.
"Final Office Action", U.S. Appl. No. 11/427,660, (Feb. 3, 2010),12 pages.
"Non Final Office Action", U.S. Appl. No. 11/427,660, (Nov. 4, 2009),7 pages.
"Notice of Allowance", U.S. Appl. No. 11/427,660, (May 7, 2010),11 pages.
"Restriction Requirement", U.S. Appl. No. 11/427,660, (Sep. 2, 2009),6 pages.
"Web Security, Restricted Access, and Bluestem", Retrieved from <http://www.uic.edu/depts/accc/webpub/security/intro.html> on Dec. 15, 2008, (Nov. 17, 2008),3 pages.
Marks, Howard "Using Win2000's Foolproof Encryption", *Network Computing*, www.networkcomputing.com, (Oct. 30, 2000),pp. 156-158.
Tang, Qiang "Using Encryption Techniques to Enhance Sticky Policies Enforcement", *Technical Report TR-CTIT-08-64*, Available at<http://eprints.eemcs.utwente.nl/14262/01/On_Using_Encryption_Techniques_to_Enhance_Sticky_Policies_Enforcement.pdf>,(2008),pp. 1-21.
Wolthusen, Stephen D., "Security Policy Enforcement at the File System Level in the Windows NT Operating System Family", 0-7695-1405, 2001 *IEEE*, (Jul. 2001),pp. 55-63.
"First Office Action and Search Report Received in Chinese Patent Application No. 201110437099.8", Mailed Date: Mar. 11, 2014, 14 Pages.
"Second Office Action Received in Chinese Patent Application No. 201110437099.8", Mailed Date: Jul. 30, 2014, 11 Pages.
"Third Office Action Received in Chinese Patent Application No. 201110437099.8", Mailed Date: Oct. 23, 2014, 6 Pages.
Gligor, et al., "On the Negotiation of Access Control Policies", In Book: Security Protocols—Lecture Notes in Computer Science, vol. 2467, Sep. 26, 2002, pp. 188-201.
U.S. Official Action dated Apr. 11, 2012 cited in U.S. Appl. No. 12/404,007, 41 pgs.
"Fourth Office Action Issued in Chinese Patent Application No. 201110437099.8", Mailed Date: Jan. 13, 2015, 8 Pages.

\* cited by examiner

CRYPTOGRAPHIC KEY MANAGEMENT

BACKGROUND

A variety of sensitive data may be encountered by a computing device in a variety of different ways. For example, a computing device may be used to store data, communicate data over a network, and so on. Additionally, this data may be quite valuable, and therefore targeted by malicious parties. Conventional techniques that were utilized to protect this data, however, may limit the type of access control rule that can be implemented, or involve storage of a vast amount of cryptographic keys. For example, an organization's data may include a large number of files shares, access to each of which is independently managed and thus may involve use of large numbers of keys in order to support desirable security properties. This traditionally resulted in complicated storage and communication techniques, especially when confronted with a large variety of data that is to be encrypted and/or decrypted separately.

SUMMARY

Cryptographic key management techniques are described. In one or more implementations, an access control rule is read that includes a Boolean expression having a plurality of atoms. The cryptographic keys that correspond to each of the plurality of atoms in the access control rule are requested. One or more cryptographic operations are then performed on data using one or more of the cryptographic keys.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Example Environment

Figure 1:
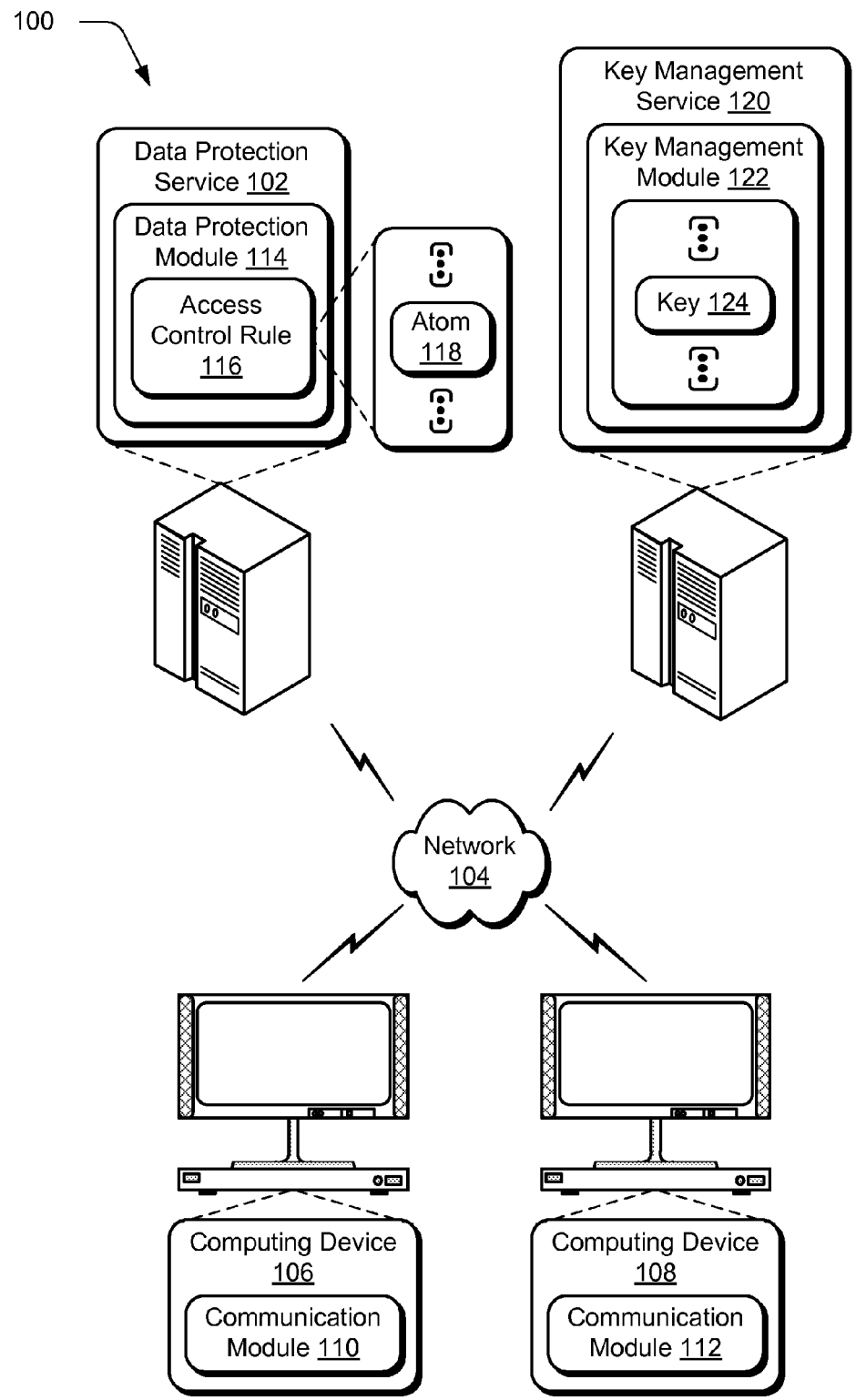
FIG. 1 illustrates an environment in an example implementation of a data protection system that is operable to employ techniques involving cryptographic key management.

FIG. 1 illustrates an environment 100 in an example implementation of a data protection system that is operable to employ techniques involving cryptographic key management. This environment 100 illustrates an example of a distributed environment that includes a data protection service 102, first and second computing devices 106, 108, and a key management service 120 that are accessible, one to another, via a network 104. The data protection service 102 and the key management service 120 are further illustrated as being implemented using one or more servers, such as part of a server farm. Although an example distributed environment is shown, it should be readily apparent that this environment 100 may be further expanded (e.g., to include a multitude of other computing devices), reduced (e.g., to be employed by two devices or even a single device), and so on. For example, the data protection service 102 may be implemented by one or both of the computing devices 106, 108, which then directly access a key management service 120 "over the cloud," and so on.

The computing devices may be configured in a variety of ways. For example, a computing device may be configured as a computer that is capable of communicating over a network 104, such as a desktop computer, a mobile station, an entertainment appliance, a set-top box communicatively coupled to a display device, a wireless phone, a game console, and so forth. Thus, the computing devices may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown (e.g., a server for the data protection service 102), the computing devices may be representative of a plurality of different devices, such as multiple servers utilized by a business to perform operations.

The computing devices may also include an entity (e.g., software) that causes hardware of the computing device to perform operations, e.g., processors, functional blocks, and so on. One such example are a communication modules 110, 112 illustrated for the respective computing devices 106, 108 that are representative of functionality of the devices to communicate via the network 104. In one or more implementations, the computing devices may include a computer-readable medium that may be configured to maintain instructions that cause the computing device, and more particularly hardware of the computing device to perform operations. Thus, the instructions function to configure the hardware to perform the operations and in this way result in transformation of the hardware to perform functions. The instructions may be provided by the computer-readable medium to the computing device through a variety of different configurations.

One such configuration of a computer-readable medium is signal bearing medium and thus is configured to transmit the instructions (e.g., as a carrier wave) to the hardware of the computing device, such as via the network 104. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the network 104 is illustrated as the Internet, the network may assume a wide variety of configurations. For example, the network 108 104 include a wide area network (WAN), a local area network (LAN), a wireless network, a public telephone network, an intranet, a Bluetooth personal area network (PAN), and so on. Further, although a single network 104 is shown, the network 104 may be configured to include multiple networks.

The data protection service 102 is illustrated as including a data protection module 114 that is representative of functionality to manage an access control rule 116 that is to serve as a basis to encrypt and decrypt data. The environment 100 is also illustrated as including a key management service 120. The key management service 120 includes a key management module 122 that is representative of functionality to manage one or more cryptographic keys, which are illustrated as key 124, to be used by the data protection service 102 to encrypt or decrypt data by the data protection service 102 according to the access control rule 116.

In one or more implementations, the access control rule 116 is a monotonic Boolean expression that is formed from a set of atoms 118, e.g., combined with "AND" and "OR" logical operators. A monotonic Boolean expression is one that can be expressed using only AND and OR logical operators, but without the NOT operator. Note that the restriction to monotonic Boolean expression in these one or more implementations is limited to the combination of the atoms; individual atoms can implement their own logic, which might include non-monotonic Boolean expressions. Each atom 118 may be represented as a string of the form "Attribute=Identifier". For example, each atom may take a form of "Security_Principal_Type=Identifier". Accordingly, data encrypted in accordance with such an access control rule 116 is configured to be decrypted, solely, by entities having attributes that satisfy the rule, e.g., the security principals that satisfy the rule.

For instance, a system based on Security Identifiers (SIDs) may employ the following access control rule "(SID=S-1-5-32-544 AND Key=MSKSP:myKeyName) OR CERTIFICATE=IssuerAndSerial:3132,3131". Thus, this access control rule includes three atoms:
  "SID=S-1-5-32-544";
  "Key=MSKSP:myKeyName"; and
  "CERTIFICATE=IssuerAndSerial:3132,3131".
Further, this access control rule specifies different collection of attributes that are to be satisfied, the SID and key or the certificate. Accordingly, a principal with access to the identified certificate, or who has the identified SID in their token and also has access to the identified key satisfies this rule.

The following discussion is arranged as follows. First, techniques for converting each atom of a cryptographic access control rule to a cryptographic key (or a secret from which encryption keys can be derived) are discussed. Use of the cryptographic key to cryptographically protect a piece of data to the access control rule is then discussed. As described previously, this may be performed in such a way that authorized principals are solely capable of decrypting the data, using one or more of the cryptographic keys of the access control rule embedded in the encrypted data. The cryptographic key corresponding to an access control rule atom is known as a protector key, and each protector key is assumed to have identifying information that can be used to locate the corresponding decryption key when desired.

Techniques are then described which involve generating protector keys and corresponding decryption keys in a manner that is efficient and scalable. For example, these techniques may be employed for entities belonging to a common security domain, such as an authorization expression for a principal, which may involve an identifier of a principal or group of principals such as a security identifier (SID) for use in a data store or directory, e.g., Microsoft Corporations Active Directory product.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

The instructions can be stored in one or more computer readable media. As described above, one such configuration of a computer-readable medium is signal bearing medium and thus is configured to transmit the instructions (e.g., as a carrier wave) to the hardware of the computing device, such as via the network 104. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data. The features of the techniques described below are platform-independent, meaning that the techniques may be implemented on a variety of commercial computing platforms having a variety of hardware configurations.

Access Control Rules

Figure 2A:
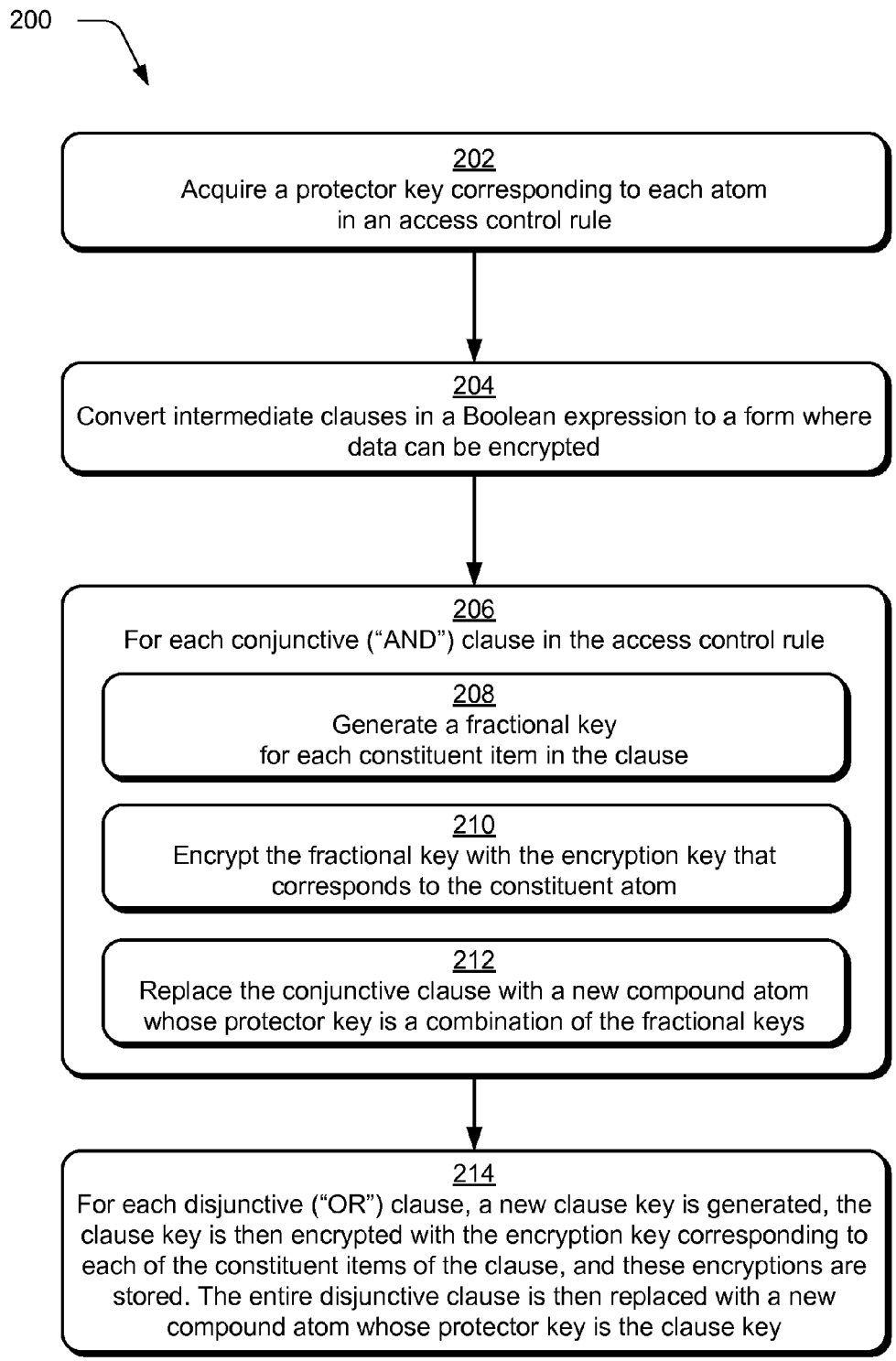
FIGS. 2A and 2B are flow diagrams depicting a procedure in an example implementation in which data is encrypted according to an access control rule.
Figure 2B:
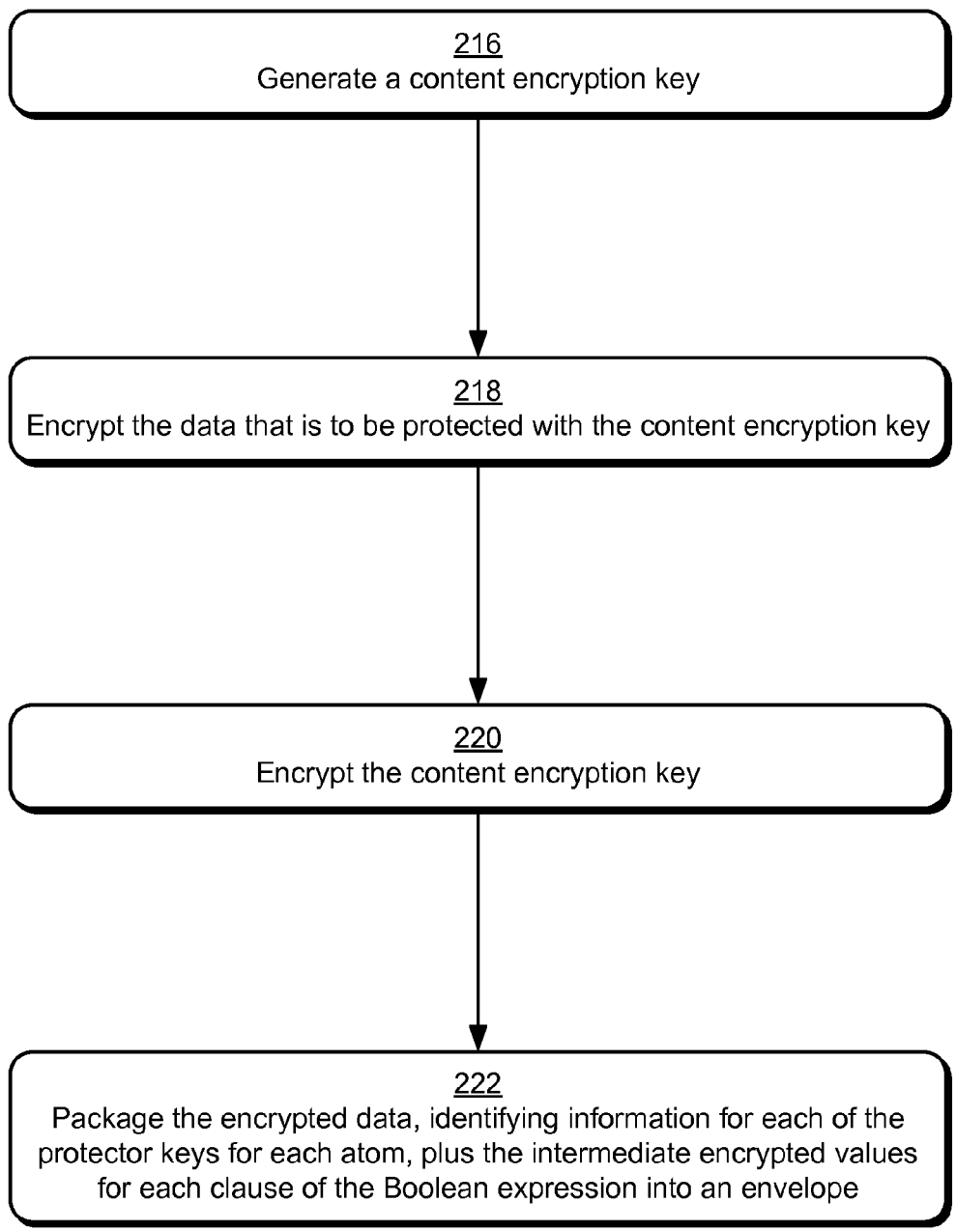

FIGS. 2A and 2B depict a procedure 200 in an example implementation in which data is encrypted accord to an access control rule. The following discussion describes techniques that may be implemented utilizing the previously and subsequently described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks.

Beginning at FIG. 2A, in order to encrypt a piece of data to an access control rule, the following operations may be performed. First, protector keys are acquired that correspond to each atom in an access control rule (block 202). For each protector key, sufficient information is also acquired to uniquely identify the protector key. In one or more implementations, the protector key for each atom allows data to be encrypted so that only entities that satisfy the requirements of the atom can decrypt the data.

Intermediate clauses in the Boolean expression are converted to a form where data can be encrypted (block 204), e.g., such that only entities that satisfy the Boolean expression can decrypt the data.

For each conjunctive ("AND") clause in the access control rule 116, the following operations are performed (block 206). For each constituent item in the clause, a fractional key is generated (block 208), e.g., using randomization techniques. The fractional key is encrypted with the encryption key corresponding to the constituent item. (block 210). For example, if the constituent item is an atom, it is encrypted with the protector key. If the constituent item is another Boolean clause, it is encrypted with the key corresponding to that clause. The entire conjunctive clause is then replaced with a new compound atom whose protector key is the combination of the fractional keys (block 212). This combination may be formed in a variety of different ways, such as by employing cryptographic techniques such as XOR or a key derivation function, e.g., a password-based key derivation function such as PBKDF2 from RSA Laboratories' Public-Key Cryptography Standards series.

For each disjunctive ("OR") clause a new clause key is generated, e.g. using randomization techniques. The clause key is then encrypted with the encryption key corresponding to each of the constituent items of the clause, and these encryptions are stored. The entire disjunctive clause is then replaced with a new compound atom whose protector key is the clause key (block 214).

As an optimization, disjunctive clauses can also be implemented directly. In one or more implementations, the clause key of a disjunctive clause is only used to encrypt other keys with (either other fractional or clause keys, or the content encryption key), although other implementations are also contemplated. Instead of encrypting the clause key with the encryption keys of the constituent items of the clause, the data that the clause key would have encrypted can be encrypted with the encryption keys of the constituent clauses. This eliminates the clause key and makes the system more efficient.

It should be readily apparent that a variety of other techniques may be employed to implement the basic conjunctive and disjunctive clauses without departing from the spirit and scope thereof.

Proceeding now to FIG. 2B, a content encryption key is generated (block 216), e.g., using randomization techniques. The data that is to be protected is then encrypted with the content encryption key (block 218), e.g., using encryption techniques such as AES-GCM.

The content encryption key is then encrypted (block 220) with the key corresponding to the top-level clause or atom in the access control rule.

The encrypted data, identifying information for each of the protector keys for each atom, plus the intermediate encrypted values for each clause of the Boolean expression are then packaged into an envelope (block 222), such as by using a Public-Key Cryptography Standards #7 published by RSA Security. Thus, the above technique allows data to be encrypted to a combination of atoms in an access control rule. The technique is also efficient in that it may use symmetric encryption techniques.

When the data is to be decrypted, the key identifying information embedded in the enveloped and packaged encrypted data may be used to retrieve one or more of the protector keys. If the set of protector keys available to a principal is sufficient to satisfy the access control rule of the encrypted data, then the principal can decrypt the intermediate keys corresponding to the clauses in the Boolean expression that are satisfied, decrypt the content protection key, and finally decrypt the actual data.

In an alternative embodiment, a content protection key is not used and the data is directly encrypted with the key associated with the topmost level of the Boolean expression of the access control rule.

Figure 3:
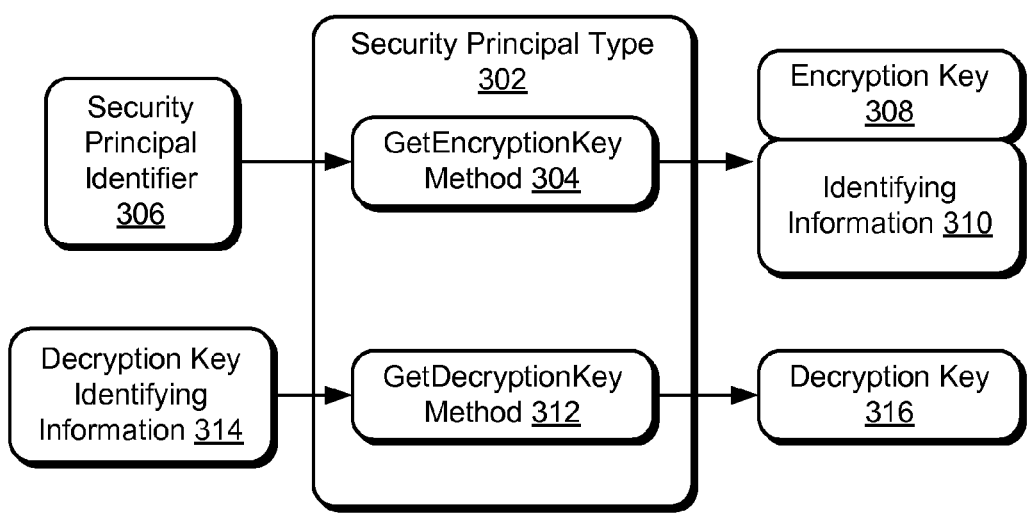
FIG. 3 is an illustration of a system in an example implementation showing a data protection module of FIG. 1 in greater detail.

FIG. 3 is an illustration of a system in an example implementation showing the data protection module 114 of FIG. 1 in greater detail. To find the protector key corresponding to each atom, each security principal type 302 may employ the following associated methods.

GetEncryptionKey Method 304

This method 304 may take a security principal identifier 306 as input, and return an encryption key 308 as well as identifying information 310 for the corresponding decryption key. In one or more implementations, the security principal identifier 306 may also function as the identifying information 310. In an implementation, this method may be performed for the calling principal even if calling principal is not authorized to access the decryption key, e.g., using asymmetric techniques.

GetDecryptionKey Method 312

In an implementation, this method takes decryption key identifying information 314, which may be the same as the identifying information 310 received from the GetEncryptionKey method 304. The GetDecryptionKey method 312 may then retrieve the decryption key 316 if and only if the calling principal is authorized to access the decryption key 316.

Figure 4:
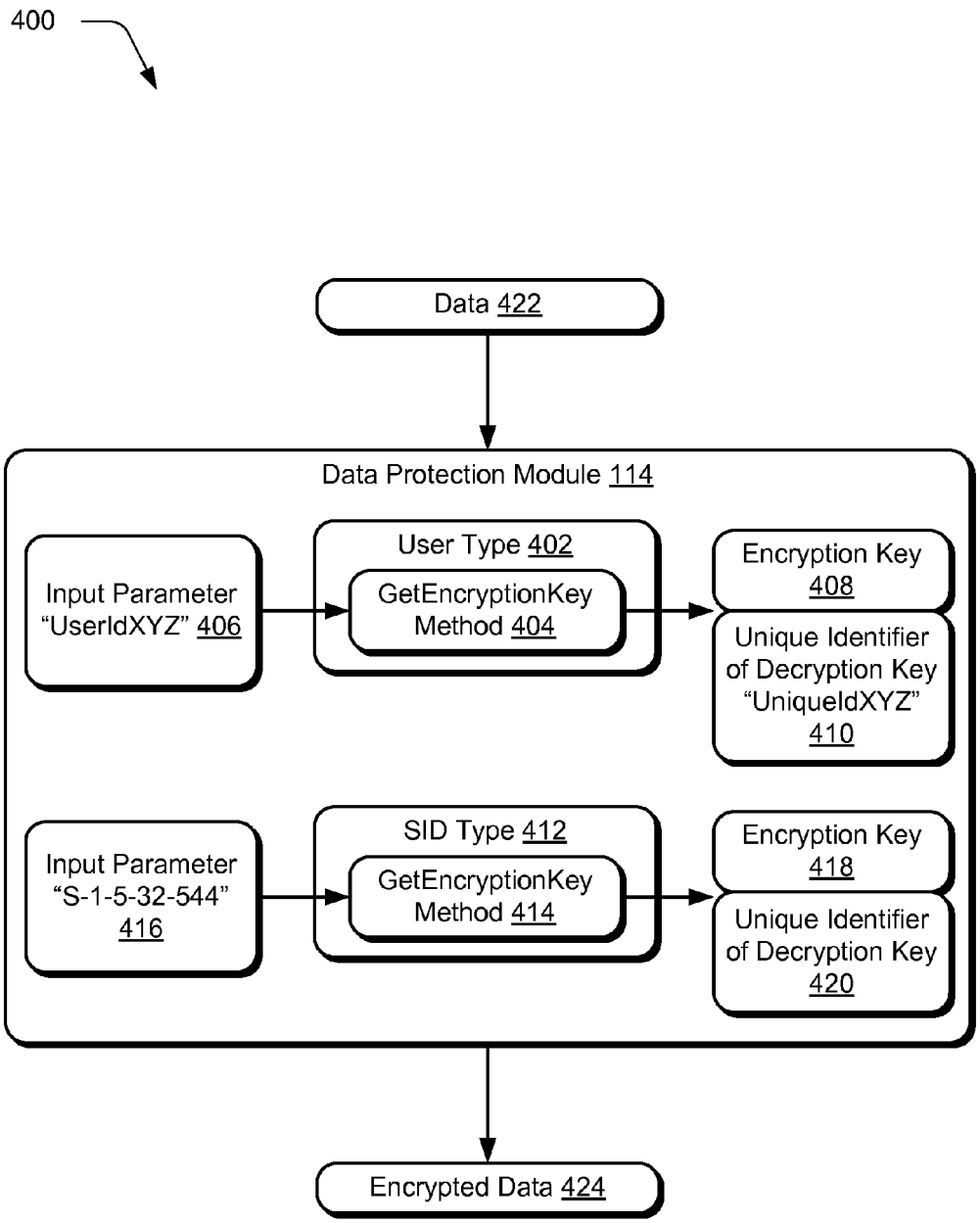
FIG. 4 illustrates an example implementation of a data protection system of FIG. 1 that is shown as encrypting data according to an access control rule.

FIG. 4 illustrates an example implementation 400 of the data protection system 102 of FIG. 1 that is shown as encrypting data according to an access control rule. In this example, a user wishes to protect a piece of data according to the following access control rule:

"User=UserIdXYZ OR SID=S-1-5-32-544".

The data protection system 102, and more particular the data protection module 114, locates a module (e.g., a sub-module of the data protection module 114) that is responsible for managing keys of type "User" 402 and calls the GetEncryptionKey method 404 of that module with input parameter "UserIdXYZ" 406. Accordingly, the user type 402 provides an encryption key 408 for that type and a unique identifier of the corresponding decryption key, which is referred to as "UniqueIdXYZ" 410 in this example.

Similarly, the data protection module 114 locates a module (e.g., a sub-module of the data protection module 114) responsible for managing keys for principals of type "SID" 412 and calls a corresponding GetEncryptionKey method 414 with input parameter "S-1-5-32-544" 416. Accordingly, the SID type 412 provides an encryption key 418 for that type and a unique identifier of the corresponding decryption key, which is referred to as "UniqueIdSid544" 420 in this example.

The data protection module 114 then encrypts the data 422 using the encryption keys 408, 418 using the techniques described earlier to obtain encrypted data 424 that is enveloped and packaged. The encrypted data 424 may then be stored for later use, transmitted to a different computing device (e.g., as described in relation to FIG. 1), and so on for later decryption.

Eventually, a computing device may be asked to decrypt the encrypted data 424 on behalf of a user or other entity, e.g., an application. Accordingly, the data protection system 102 may attempt to retrieve decryption keys identified by the unique identifiers "UniqueIdXYZ" and "UniqueIdSid544" 410, 420 using GetDecryptionKey methods, examples of which were described in relation to FIG. 3. If neither can be obtained, the encrypted data 424 cannot be decrypted. If either of the decryption keys was obtained, the data protection system 102 uses it to decrypt the data and validate its integrity. If the integrity check fails, an error is returned; otherwise, the system returns the decrypted data to the user.

In this example, if the entity that tries to decrypt the data is authorized for both decryption keys, then the data protection module 114 can choose which one to use. More generally, an entity that wishes to decrypt the data that is protected to a particular access control rule might have multiple ways to satisfy the access control rule Boolean expression. In an implementation, retrieving the decryption keys for different atoms can have different costs where the costs can be of many forms, for example: CPU time, disk access, network access, network latency, user interaction, etc. In an implementation, the data protection module can select the set of atoms for which it acquires the decryption keys in a way that minimizes costs (using whatever metric is most appropriate for the circumstance) while still acquiring enough decryption keys to decrypt the data.

Figure 5:
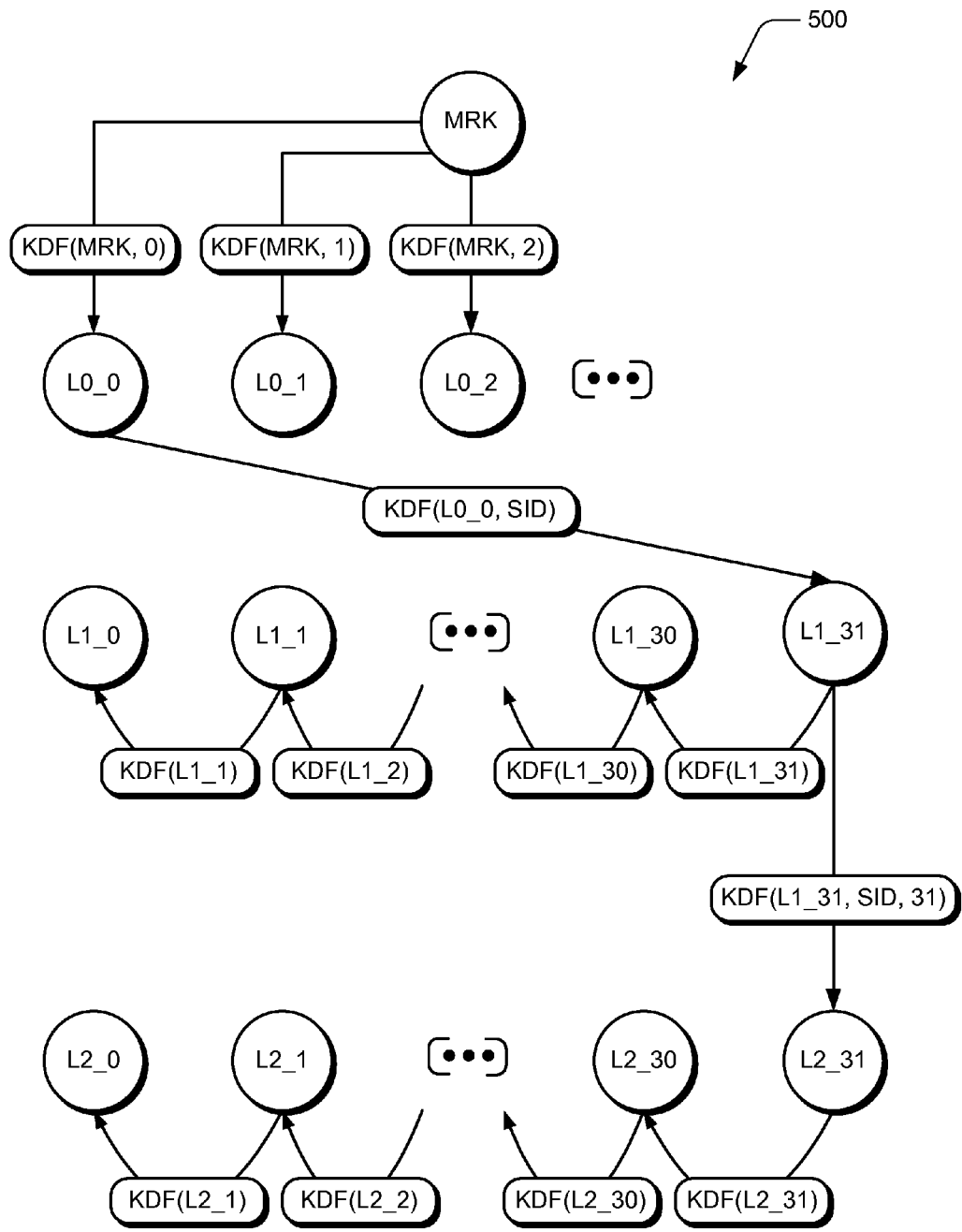
FIG. 5 illustrates an example implementation of a multilevel key derivation scheme.

FIG. 5 illustrates an example implementation 500 of a multilevel key derivation scheme. This key derivation scheme employs an authorization expression for a principal that may leverage an identifier of a principal or group of principals, an example of which is SID in the following discussion although other examples are also contemplated. This example shows a three-level derivation, with the first level (labeled L0) having chain length 1, and the other levels (L1 and L2) having a chain length of 32, although it should be readily apparent that other lengths and more or fewer levels are also contemplated. For simplicity, the same key derivation function is used throughout, and is represented as KDF, although it should be readily apparent that a variety of different derivation functions may be employed. MRK represents a master root key in the example implementation.

This technique is described as using a trusted authentication service (including a distributed service such as Active Directory) to obtain keys corresponding to each unique identity in the service's security domain. For example, this technique can be used by an Active Directory Domain Controller to generate a protector key for each SID in an AD forest and respond to requests for such keys. This example implementation includes the following components.

Master Keys

One or more master keys (MRK) are employed for the security domain, as well as a unique identifier for each master key and a rule for determining a current master key from a set of master keys.

Derivation Levels

A number of derivation levels N may be supported, which in the illustrated example is three levels. For each derivation level k between 0 and N−1, an initial key derivation function $KDF1\_k$ is employed. A rule for determining its parameters may also be employed, which may be based on the identifier or other attribute of the security principal (e.g., an authorization expression that can be satisfied by the principal), the current time and optional additional parameters. A chain key derivation function $KDF2\_k$ is also employed for each of the derivation levels along with a rule for determining respective parameters based on the attribute (e.g., identifier) or authorization expression of the security principal, the current time and optional additional parameters. A chain length $M\_k$ is also employed for each of the "k" derivation levels.

Time Intervals

A time interval T1 represents how often new encryption keys are created for a given security principal. This may be used to indirectly determine the key lifetime at each level in the hierarchy. For instance, consider an instance having three levels (i.e., N=3), as shown in FIG. 5. A new key for the second derivation level "L2" is generated at time interval "T1." This means that a new key for the first derivation level "L1" is generated at a time interval "32*T1," which in turn means that a new key for the highest derivation level "L0" is generated at a time interval "32*32*T1=1024*T1." A key is said to have been exhausted when the creation times of each of the keys that can be derived from that key has passed. For example, an "L1" key is considered exhausted if the creation times of each of the "L2" keys derived there from are in the past. By definition in one or more implementations, the master key cannot be exhausted.

A time interval "T2" represents how long a given encryption key may be used to encrypt new data for a given security principal. Thus, the cryptographic keys may be changed often such that an explicit key revocation technique is not employed in an implementation.

Symmetric Encryption Algorithm

A symmetric encryption algorithm A1, as well as a key derivation function KDF_s that can be used to derive keys for that algorithm may be employed in this example implementation. Protector keys for use with this algorithm may be derived when the principal making a GetEncryptionKey call is authorized to access the corresponding decryption key.

Asymmetric Algorithm

An asymmetric algorithm A2, as well as two key derivation functions KDF_e and KDF_d may be used in this implementation to derive a matched pair of encryption and decryption keys for that algorithm. Protector key pairs for use with this algorithm may be derived when the principal making a GetEncryptionKey call is not authorized to access the key pair's decryption key.

Figure 6:
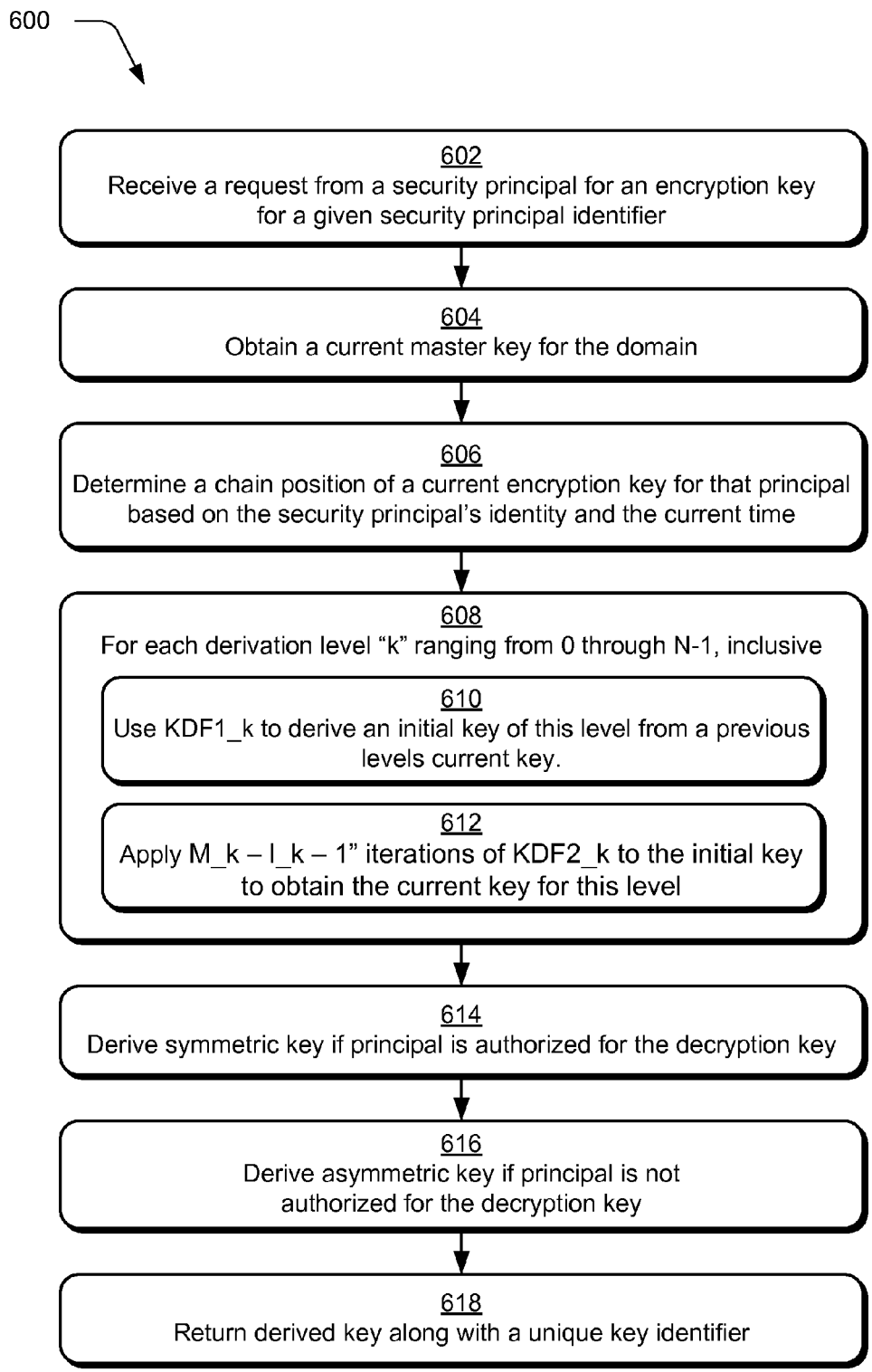
FIG. 6 is a flow diagram depicting a procedure in an example implementation in which a security principal requests an encryption key from a data protection service employing the multilevel key derivation scheme of FIG. 5.

FIG. 6 depicts a procedure 600 in an example implementation in which a security principal requests an encryption key from a data protection service employing the multilevel key derivation scheme of FIG. 5. The following discussion describes key derivation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the example implementation of FIG. 5.

A data protection service receives a request from a security principal S for an encryption key for a given security principal identifier S' (block 602). In response, the data protection service obtains a current master key for the domain (block 604). Based on the security principal's identity and the current time, the data protection service then determines the chain positions $(1\_0, 1\_1, \ldots, 1\_N-1)$ of the current encryption key for that principal (block 606). Note that each chain position $l\_k$ is an integer between 0 and $(M\_k-1)$ in this implementation.

For each derivation level k ranging from 0 through N−1, inclusive, the following operations are performed (block 608). $KDF1\_k$ is used to derive an initial key of this level from the previous level's current key (block 610). For k=0, the master key is the previous level's key. "$M\_k-1\_k-1$" iterations of $KDF2\_k$ are applied to the initial key, to obtain the current key for this level (block 612).

Once the current key for level N−1 has been obtained the following operations may then be performed. If the principal S is authorized for the decryption key of the requested security principal S', a symmetric key is derived using KDF_s (block 614). If the principal S is not authorized for the decryption key of the requested security principal S', an asymmetric encryption key is derived using KDF_e (block 616).

The key derived in the preceding operation, along with a unique key identifier, for example constructed by concatenating the security principal's attributes (e.g., identifying attributes) ID S', the unique ID of the master key, and the tuple $(1\_0, 1\_1, \ldots, 1\_N-1)$ is then returned to the security principal (block 618). For efficiency, a client implementation may cache encryption keys. However, in one or more implementations, an encryption key older than T2 is not used to encrypt new data in an implementation.

When a principal "R" requests a decryption key from the server, the principal "R" supplies the unique key identifier. The unique key identifier contains the security principal identifier R' of the key, the unique ID of the master key, and the tuple (1_0, 1_1, . . . , 1_N−1). The data protection service may then perform a procedure similar to the above, with the following differences. If the calling security principal R is not authorized for the security principal identifier R', an error is returned. Otherwise, the service returns the newest and highest-level exhausted key that principal "R" is authorized to access which can be used to derive the requested decryption key. The client may then apply one or more key derivation functions to obtain the appropriate decryption key. For example, in the implementation shown in FIG. 5, the KDF parameters have been chosen in a way that the L0 keys are not dependent on the security principal (here a SID) and therefore the L0 keys are never handed out as decryption keys. However, each L0 key has a corresponding L1_31 key which is derived using the SID, and which can be handed out to principal "R". Alternatively, the server can return the exact decryption key corresponding to the identifier supplied by principal "R".

In one example implementation, the following algorithm choices are made, although it should be readily apparent that other choices are also contemplated. The Advanced Encryption Standard (AES) algorithm, in the Galois Counter Mode (GCM) of operation, may be used as A1. The Diffie-Hellman-Merkle algorithm, with a specified group generator, modulus and subgroup size, may be used as algorithm A2. One of the key derivation functions specified in NIST Special Publication 800-108 may be used for each of the KDF1 and KDF2 functions, as well as the KDF_s function. Function KDF_d may employ the SP 800-108 KDF, with its output truncated to the size of the private subgroup for A2. Function KDF_e would then be performed by applying KDF_d and computing the corresponding public key. For the Diffie-Hellman-Merkle algorithm, this involves raising the group generator to the integer represented by the output of KDF_d, modulo the group modulus.

These techniques may therefore be leveraged to provide a variety of properties. For example, the data protection service may store a relatively small set of master keys, regardless of the total number of security principals. Additionally, a security principal cannot feasibly determine decryption keys for a security principal identifier for which the principal is not authorized. Further, a security principal cannot feasibly compute the master key nor compute future keys.

Yet further, a security principal "A" may cryptographically protect data for a set of principals "B" even when "A" is not a member of the set "B." Like the service, clients may also cache a relatively small set of keys in order to be able to decrypt each item of past data that was encrypted to a given security principal. For example, in the example key hierarchy of FIG. 5, it is sufficient to cache the L1_31 key corresponding to each exhausted L0 key, plus one L1 key and one L2 key corresponding to the current L0 key. Thus, the total cache size for each principal is limited to one key per 1024 T1 periods, plus two keys.

The mechanism described herein can also be used to derive keys for any access control rule that can be evaluated by a computing device. For example, instead of a SID, the access control rule could contain an arbitrary expression such as "all employees of the HR department EXCEPT interns". A negative like the EXCEPT clause generally cannot be expressed in the Boolean combination of an access control rule for the data protection service 102. However, it can be expressed in the access control rule of an individual atom, as implemented by the key management service 120.

Figure 7:
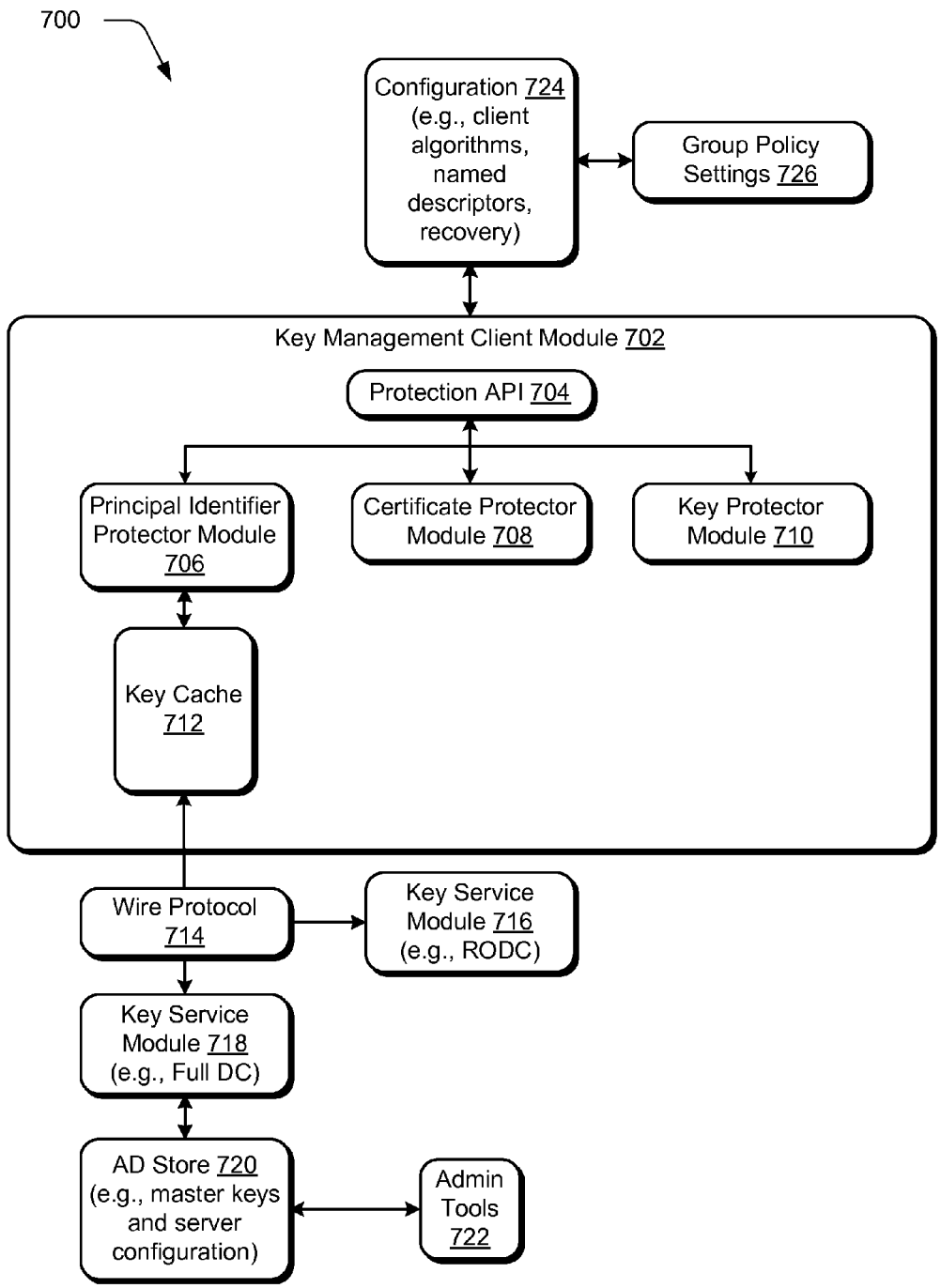
FIG. 7 illustrates an example implementation of a system that is operable to employ the hierarchical techniques described in relation to FIGS. 5 and 6.

FIG. 7 illustrates an example implementation of a system 700 that is operable to employ the hierarchical techniques described in relation to FIGS. 5 and 6. The system 700 as illustrated includes a key management client module 702 having a protection API 704 that is callable to access functionality represented by the module. For example, the protection API 704 may be called to access a principal identifier (e.g., SID) protector module 706, a certificate protector module 708, and a key protector module 710. The key protector module 710 is representative of functionality to manage keys. The certificate protector module 708 is representative of functionality to maintain and manage certificates by the key management client module 702.

The principal identifier protector module 706 is representative of functionality relating to principal identifiers, such as security identifiers (SIDs). For example, the principal identifier protector module 706 may be used to maintain a key cache 712 locally, e.g., an SID key cache. The principal identifier protector module 706 may leverage one or more wired or wireless protocols 714 to access a key service module 716, which can be implemented in a read only domain controller (RODC) and/or a key service module 718 that is configured to function within a full domain controller. An AD store 720 may also be employed by the system 700, which may be used to maintain master keys and server configurations (and may be accessed and managed using one or more admin tools 722).

The key management client module 702 is also illustrated as being in communication with configuration 724 data, such as client algorithms, named descriptors, recovery, and so on, which is further illustrated as leveraging group policy settings 726.

Although the examples above of FIGS. 5-7 were described in relation to an active directory, it should be noted that the techniques described herein may be used also for other applications of cryptography. For example, a system for integrity-protecting data may be implemented such that authorized security principals, alone, may verify the integrity (or authenticity) of a given piece of data.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices of a principal, the method comprising:
    reading key identifiers of an access control rule embedded with encrypted data;
    forming a request that includes the key identifiers and describes one or more attributes of the principal that requests access to the data;
    receiving a response to the request that includes a set of decryption keys that are authorized for use by the principal based on the described one or more attributes; and
    comparing the set of decryption keys, received in the response, to the access control rule to determine whether a collection of the decryption keys has been obtained to decrypt the encrypted data.

2. A method as described in claim 1, wherein the key identifiers of the access control rule are embedded with the encrypted data in an envelope.

3. A method as described in claim 1, wherein the access control rule is formed from a set of atoms in a Boolean expression, each corresponding to a respective one of a plurality of attributes.

4. A method as described in claim 3, wherein the decryption keys included in the response correspond to the attributes in the access control rule that are satisfied by the principal.

5. A method as described in claim 3, wherein at least one atom from the set of atoms corresponds to an attribute that is defined to be satisfied by a principal to perform a decryption operation on the encrypted data.

6. A method as described in claim 3, wherein the access control rule supports at least two collections of attributes, either of which are configured to permit access to said cryptographic keys.

7. A method as described in claim 3, wherein access to the set of decryption keys is based on whether a principal that requests the set of decryption keys shares the one or more attributes that corresponds to a respective atom of the set of atoms as defined by the access control rule.

8. A system comprising:
one or more computing devices of a principal configured to execute computing instructions which, when executed, cause the one or more computing devices to:
read key identifiers of an access control rule embedded with encrypted data;
form a request that includes the key identifiers and describes one or more attributes of the principal that requests access to the data;
receive a response to the request that includes a set of decryption keys that are authorized for use by the principal based on the described one or more attributes; and
compare the set of decryption keys, received in the response, to the access control rule to determine whether a collection of the decryption keys has been obtained to decrypt the encrypted data.

9. A system as described in claim 8, wherein the key identifiers of the access control rule are embedded with the encrypted data in an envelope.

10. A system as described in claim 8, wherein the access control rule is formed from a set of atoms in a Boolean expression, each corresponding to a respective one of a plurality of attributes.

11. A system as described in claim 10, wherein the decryption keys included in the response correspond to the attributes in the access control rule that are satisfied by the principal.

12. A computer-readable storage device not consisting of a propagated signal, the computer-readable storage device comprising computer executable instructions stored thereon which, when executed, cause one or more computing devices of a principal to perform a method comprising:
reading key identifiers of an access control rule embedded with encrypted data;
forming a request that includes the key identifiers and describes one or more attributes of the principal that requests access to the data;
receiving a response to the request that includes a set of decryption keys that are authorized for use by the principal based on the described one or more attributes; and
comparing the set of decryption keys, received in the response, to the access control rule to determine whether a collection of the decryption keys has been obtained to decrypt the encrypted data.

13. A computer-readable storage device as described in claim 12, wherein the key identifiers of the access control rule are embedded with the encrypted data in an envelope.

14. A computer-readable storage device as described in claim 12, wherein the access control rule is formed from a set of atoms in a Boolean expression, each corresponding to a respective one of a plurality of attributes.

15. A computer-readable storage device as described in claim 14, wherein the decryption keys included in the response correspond to the attributes in the access control rule that are satisfied by the principal.

* * * * *